United States Patent
Moon et al.

(10) Patent No.: US 8,275,208 B2
(45) Date of Patent: Sep. 25, 2012

(54) METHOD AND APPARATUS FOR ENCODING AND DECODING IMAGE USING IMAGE SEPARATION BASED ON BIT LOCATION

(75) Inventors: Young-ho Moon, Suwon-si (KR); Woo-sung Shim, Suwon-si (KR); Sung-bum Park, Seongnam-si (KR); Dai-woong Choi, Seoul (KR); Jong-bum Choi, Suwon-si (KR); Jae-won Yoon, Seoul (KR); Jung-hyeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 708 days.

(21) Appl. No.: 12/467,795

(22) Filed: May 18, 2009

(65) Prior Publication Data

US 2010/0002943 A1 Jan. 7, 2010

Related U.S. Application Data

(60) Provisional application No. 61/129,532, filed on Jul. 2, 2008.

(30) Foreign Application Priority Data

Sep. 2, 2008 (KR) .................. 10-2008-0086286

(51) Int. Cl.
*G06K 9/36* (2006.01)
(52) U.S. Cl. ......... 382/232; 382/233; 382/238; 382/244
(58) Field of Classification Search .................. 382/232, 382/233, 244, 238, 251, 100; 345/84, 85, 345/86, 204; 348/460; 386/E5.024; 375/E7.14, 375/E7.161
See application file for complete search history.

(56) References Cited

U.S. PATENT DOCUMENTS

| | | | |
|---|---|---|---|
| 5,768,426 A * | 6/1998 | Rhoads | .................. 382/232 |
| 6,785,425 B1 | 8/2004 | Feder et al. | |
| 2002/0084921 A1 | 7/2002 | Chen et al. | |
| 2004/0183703 A1 | 9/2004 | Kim et al. | |
| 2009/0279797 A1 | 11/2009 | Choi et al. | |
| 2009/0285497 A1 | 11/2009 | Choi et al. | |

FOREIGN PATENT DOCUMENTS

| KR | 10-2009-0117325 A | 11/2009 |
|---|---|---|
| KR | 10-2009-0119435 A | 11/2009 |

* cited by examiner

*Primary Examiner* — Anh Hong Do
(74) *Attorney, Agent, or Firm* — Sughrue Mion, PLLC (57) ABSTRACT

Provided are method and apparatus for encoding and decoding an image by using a bit plane-based image encoding method and a block-based image encoding method respectively on bit planes based on the n-m most significant bits of an input image including n-bit pixel values and an image based on the m least significant bits of the input image.

22 Claims, 10 Drawing Sheets

METHOD AND APPARATUS FOR ENCODING AND DECODING IMAGE USING IMAGE SEPARATION BASED ON BIT LOCATION

CROSS-REFERENCE TO RELATED PATENT APPLICATION

This application claims the benefit of U.S. Provisional Application No. 61/129,532, filed on Jul. 2, 2008, in the U.S. Patent and Trademark Office, and Korean Patent Application No. 10-2008-0086286, filed on Sep. 2, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to encoding and decoding an image, and more particularly, to a method and apparatus for encoding and decoding an image including pixel bits.

2. Description of the Related Art

Methods of separating an input image including n-bit pixel values into n-bit planes, and compression encoding each of the n-bit planes, i.e. binary images are widely used.

Joint Bi-level Image Experts Group (JBIG) is a standard for compression encoding and decoding a binary image. JBIG is a separate image compressing standard from Joint Photographic Experts Group (JPEG) in order to perform effective compression encoding and decoding in a system for processing an input image by generating a binary image, such as a printer or a facsimile.

By using a method of encoding and decoding an image, whereby an input image is processed by generating a binary image, an image including a lot of margins without a pixel value or a lot of straight lines with repeated pixel values is effectively encoded and decoded.

SUMMARY OF THE INVENTION

The present invention provides a method and apparatus for encoding and decoding an image including n-bit pixel values.

According to an aspect of the present invention, there is provided a method of encoding an image, the method including: from an input image comprising n-bit pixel values, generating n-m bit planes based on the n-m most significant bits of the pixel values and an image based on the m least significant bits of the pixel values; encoding each of the n-m bit planes by using a bit plane-based image encoding method; and encoding the image based on the m least significant bits of the image by using a block-based image encoding method, wherein n and m are positive integers satisfying 0<m<n.

The encoding of each of the n-m bit planes may include performing lossless compression encoding on the n-m bit planes according to a Joint Bi-level Image Experts Group (JBIG) standard.

The encoding of the image based on the m least significant bits of the pixel values may include performing prediction encoding on blocks included in the image, based on one intra prediction mode selected from a plurality of intra prediction modes.

According to another aspect of the present invention, there is provided a method of decoding an image, the method including: decoding each of n-m bit planes based on the n-m most significant bits of n-bit pixel values, by using a bit plane-based image decoding method, in order to generate an output image comprising the n-bit pixel values; decoding an image based on the m least significant bits of the pixel values, by using a block-based image decoding method; and generating the output image comprising the n-bit pixel values, based on the n-m bit planes and the image based on the m least significant bits, wherein n and m are positive integers satisfying 0<m<n.

According to another aspect of the present invention, there is provided an apparatus for encoding an image, the apparatus including: an image divider which, from an input image including n-bit pixel values, generates n-m bit planes based on the n-m most significant bits of the pixel values and an image based on the m least significant bits of the pixel values; a first encoder which encodes each of the n-m bit planes by using a bit plane-based image encoding method; a second encoder which encodes the image based on the m least significant bits of the image by using a block-based image encoding method; and a multiplexer which multiplexes data of the n-m bit planes and data of the image based on the m least significant bits generated by the first and second encoders, wherein n and m are positive integers satisfying 0<m<n.

According to another aspect of the present invention, there is provided an apparatus for decoding an image, the apparatus including: an inverse multiplexer which demultiplexes data of an output image comprising n-bit pixel values into data of n-m bit planes based on the n-m most significant bits of the pixel values and data of an image based on the m least significant bits of the pixel values; a first decoder which decodes the n-m bit planes based on the n-m most significant bits of the pixel values, by using a bit plane-based image decoding method; a second decoder which decodes the image based on the m least significant bits of the pixel values, by using a block-based image decoding method; and an image restorer which generates the output image comprising the n-bit pixel values, based on the n-m bit planes and the image based on the m least significant bits, wherein n and m are positive integers satisfying 0<m<n.

According to another aspect of the present invention, there is provided a computer readable recording medium having recorded thereon a program for executing the above methods

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
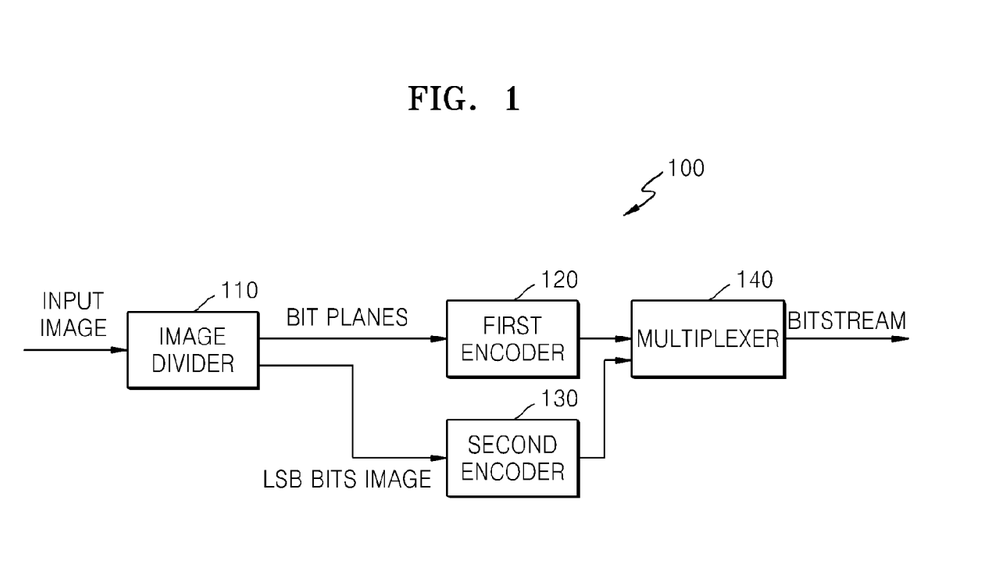
FIG. 1 is a block diagram of an apparatus for encoding an image, according to an embodiment of the present invention.

FIG. 1 is a block diagram of an apparatus 100 for encoding an image, according to an embodiment of the present invention.

Referring to FIG. 1, the apparatus 100 according to the current embodiment includes an image divider 110, a first encoder 120, a second encoder 130, and a multiplexer 140.

The image divider 110 divides an input image including n-bit pixel values into a plurality of bit planes and an image based on least significant bits, based on pixel locations. The image divider 110 generates n-m bit planes based on the n-m most significant bits, and generates an image based on the m least significant bits. Here, n is a positive integer and m is a positive integer satisfying 0<m<n. The apparatus 100 will be described in detail with reference to FIGS. 2 through 4.

Figure 2:
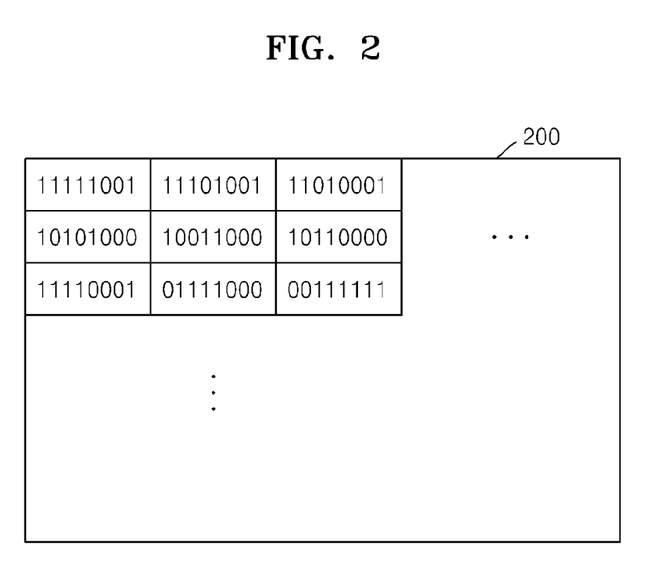
FIG. 2 is a diagram illustrating an image including n-bit pixel values, according to an embodiment of the present invention.
Figure 3A:
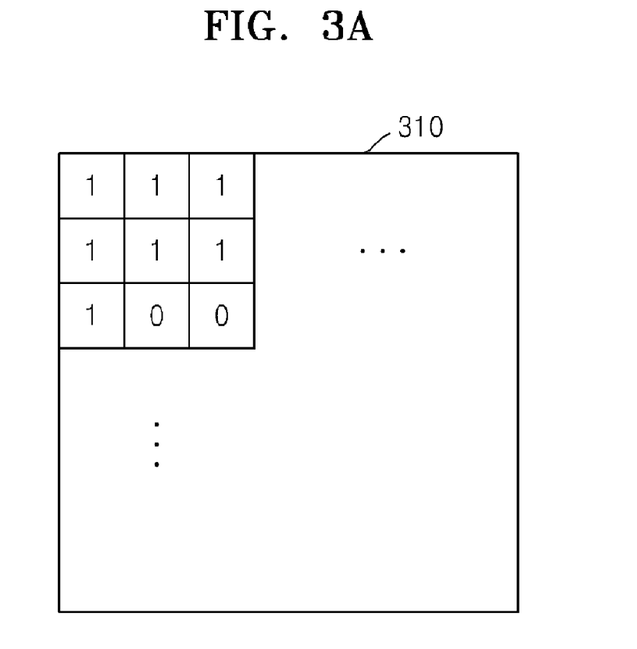
FIGS. 3A through 3D are diagrams illustrating a plurality of bit planes according to embodiments of the present invention.
Figure 3B:
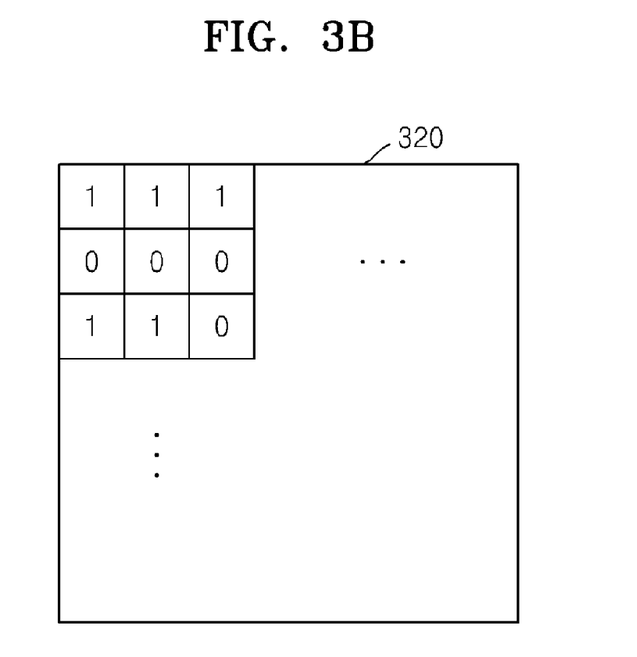
Figure 3C:
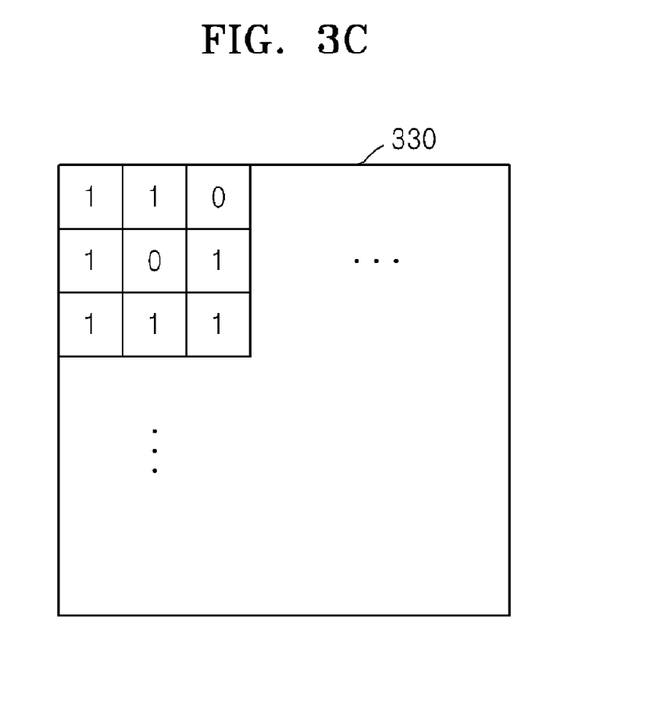
Figure 3D:
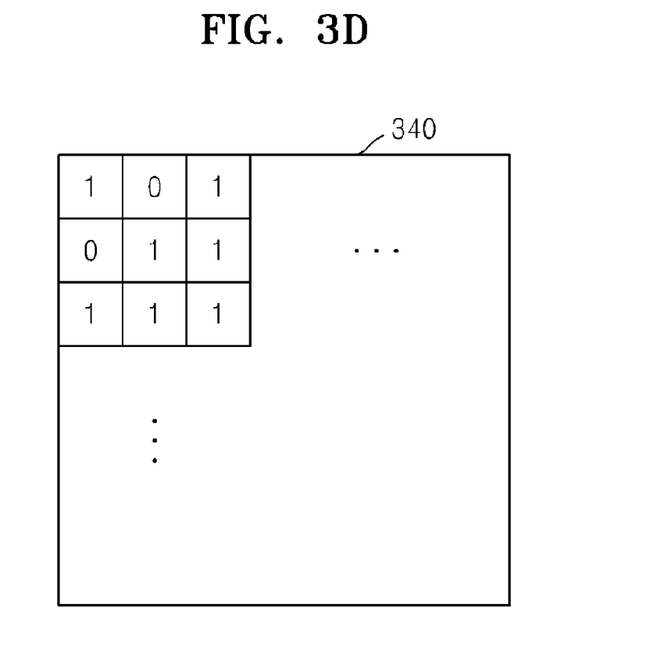

FIG. 2 is a diagram illustrating an input image 200 including n-bit pixel values, according to an embodiment of the present invention. In FIG. 2, n is 8. An 8-bit pixel value in each pixel location is expressed in a binary column. When a pixel value is in a YUV color space, the pixel value may be a luminance or chrominance value in a corresponding pixel location, and when a pixel value is in an RGB color space, the pixel value may be an R, G, or B value in a corresponding pixel location.

When bit planes are generated by using the 4 most significant bits of the n-bit pixel values of the input image 200 of FIG. 2, four bit planes 310 through 340 respectively illustrated in FIGS. 3A through 3D are generated. The image divider 110 generates the bit plane 310 of FIG. 3A including binary values of the most significant bits of the pixel values in the input image 200, and generates the bit plane 320 of FIG. 3B including binary values of the next most significant bits of the pixel values in the input image 200. By repeating this process for the remaining 2 bits, the image divider 110 generates the 4 bit planes 310 through 340.

Figure 4:
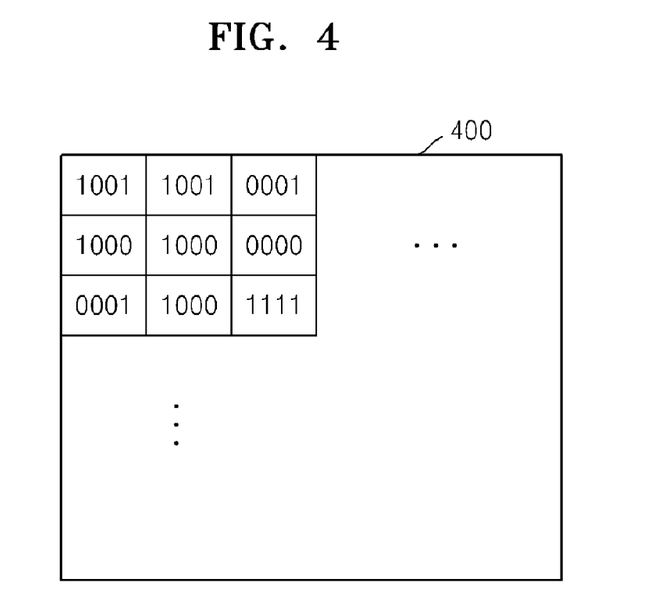
FIG. 4 is a diagram illustrating an image based on lower bits, according to an embodiment of the present invention.

FIG. 4 is a diagram illustrating an image 400 based on least significant bits, according to an embodiment of the present invention. The image divider 110 generates the image 400 including values of the 4 least significant bits as pixel values.

In FIGS. 2 through 4, n is 8 and m is 4, but n and m are not limited thereto, as long as n is a positive integer and m is a positive integer satisfying 0<m<n. For example, n may be 16 and m may be 8, or n may be 8 and m may be 6.

It is well known in the related art that least significant bits of a pixel value have a higher possibility than upper bits to have random values. Accordingly, an apparatus for encoding and decoding an image according to an embodiment of the present invention uses such features, and encodes the upper bits and the lower bits by using different encoding methods so as to efficiently encode the image. For this, the image divider 110 generates bit planes based on the n-m most significant bits of pixel values and an image based on the m least significant bits of the pixel values.

While generating the image by dividing the pixel values, the image divider 110 may convert the n-bit pixel values through a predetermined preprocess in such a way that the image is suitable for encoding. As the predetermined preprocess, binary columns of the n bit pixel values may be converted to gray codes.

For example, when pixel values of first columns of the input image 200 of FIG. 2 are "127, 127, 128, 128, 128, 128, 128, . . . ", binary columns of the pixel values are "01111111, 01111111, 10000000, 10000000, 10000000, 10000000, 10000000, 10000000, . . . ". In this case, by separating bits of the pixel values into the 4 most significant bits and the 4 least significant bits, the 4 least bit significant pixel values are "1111, 1111, 0000, 0000, 0000, 0000, 0000, . . . ", i.e. "15, 15, 0, 0, 0, 0, 0, . . . ". When pixel values having a difference of 1 are divided into most significant and least significant bits, the difference between the pixel values become 15. Here, correlation between pixel values of the 4 least significant bits decreases, and thus a compression rate of encoding decreases. Accordingly, the pixel values are converted to gray codes, and the converted gray codes are divided into most significant and least significant bits.

When the binary string of the pixel values are converted to gray codes, the binary columns become "01000000, 01000000, 11000000, 11000000, 11000000, 11000000, 11000000, . . . ". Accordingly, pixel values of the 4 least significant bits are all "0000", and thus compression encoding efficiency of an image based on least significant bits increases.

Referring back to FIG. 1, the first encoder 120 encodes each of the n-m bit planes generated by the image divider 110, by using a bit plane-based image encoding method. For example, lossless compression encoding may be performed on each of the n-m bit planes according to a JBIG standard. A method of encoding a bit plane follows a conventional method of encoding a binary image. As a result of encoding the n-m bit planes, a bitstream of the n-m bit planes is generated.

The second encoder 130 encodes the image 400 of FIG. 4 based on the m least significant bits generated by the image divider 110, by using a block-based image encoding method. As described above, values of the m least significant bits are more likely to have random values than the most significant bits. However, since the block-based image encoding method includes performing inter prediction or intra prediction on an image in block units, generating a residual block by subtracting a prediction block generated as a result of the inter prediction or intra prediction from an original block, and then encoding the residual block, it is convenient to remove temporal and spatial redundancy of random pixel values. Accordingly, the second encoder 130 prediction encodes the image 400 based on the m least significant bits in block units, by using the block-based image encoding method, such as H.264.

Here, a bypass mode of H.264 may be used for lossless encoding. The bypass mode performs entropy encoding on residual values included in a residual block without performing discrete cosine transform on the residual block. The residual values may be losslessly encoded by setting a quantization parameter (qP) to 0 and encoding the residual values in the bypass mode. The residual values are losslessly encoded by removing a loss generated during the discrete cosine transform and a loss generated during quantization. This will be described in detail with reference to FIG. 5.

Figure 5:
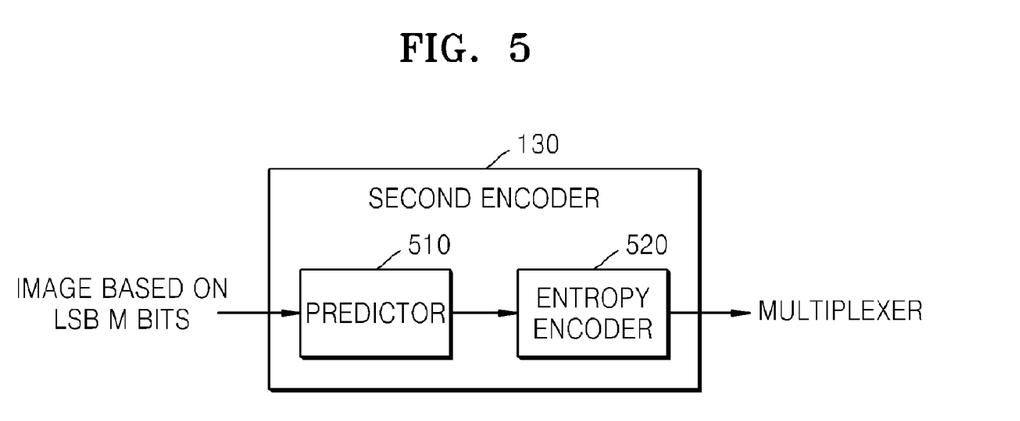
FIG. 5 is a block diagram of an encoder for performing a block-based image encoding process, according to an embodiment of the present invention.

FIG. 5 is a block diagram of the second encoder 130 according to an embodiment of the present invention.

Referring to FIG. 5, the second encoder 130 according to the current embodiment includes a predictor 510 and an entropy encoder 520.

The predictor 510 inter predicts or intra predicts the image 400 based on the m least significant bits in a block unit. While predicting a predetermined block (hereinafter, referred to as a current block) of the image 400, inter prediction is performed by searching for a reference picture by using values of m bits included in the current block, or intra prediction is performed by using pixels included in a previously encoded area adjacent to the current block. The intra prediction will now be described in detail with reference to FIGS. 6 and 7.

Figure 6:
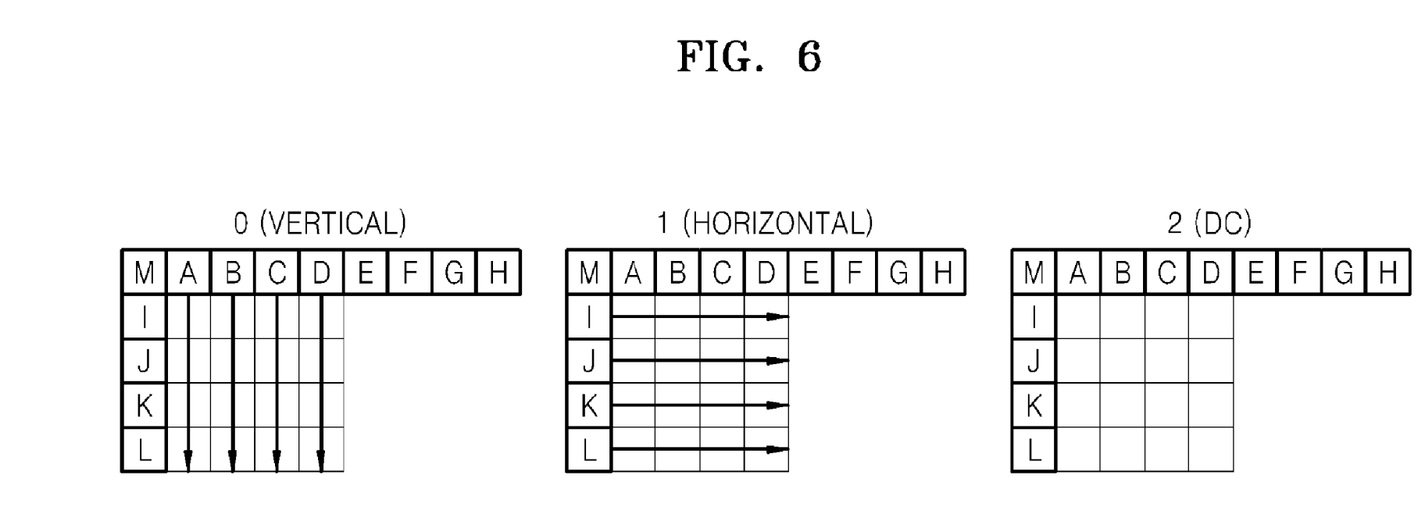
FIG. 6 shows diagrams illustrating intra prediction modes according to an embodiment of the present invention.

FIG. 6 shows diagrams illustrating intra prediction modes according to an embodiment of the present invention.

H.264 provides 9 intra prediction modes for predicting pixel values in a 4×4 block. The 9 intra prediction modes are a vertical mode, a horizontal mode, a direct current (DC) mode, a diagonal down-left mode, a diagonal down-right mode, a vertical right mode, a vertical left mode, a horizontal-up mode, and a horizontal-down mode. Referring to FIG. 6, the predictor 510 may perform the intra prediction by using the vertical mode, the horizontal mode, and the DC mode from among the 9 intra prediction modes, while predicting the current block in the image 400.

Since the vertical mode, the horizontal mode, and the DC mode are mostly used according to statistics while performing intra prediction, the current block may be intra predicted by using one of these three intra prediction modes. When intra prediction modes other than these three are used, additional bits for indicating an intra prediction mode are required, and thus bits are spared by minimizing the number of selectable intra prediction modes.

FIGS. 7A through 7E are diagrams illustrating intra prediction modes according to another embodiment of the present invention. FIGS. 7A through 7E illustrates intra prediction modes that can accurately predict a current block considering the randomness of least significant bit pixel values, aside from the intra prediction modes illustrated in FIG. 6.

Figure 7A:
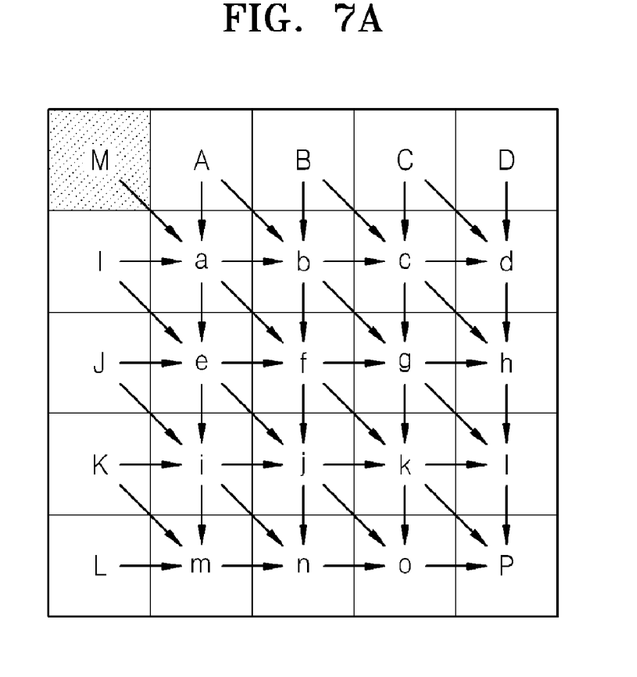
FIGS. 7A through 7E are diagrams illustrating intra prediction modes according to another embodiment of the present invention.

According to the intra prediction mode illustrated in FIG. 7A, a current block is intra predicted based on pixel values of pixels that are closest to a predetermined pixel (hereinafter, referred to as a current pixel). Here, the pixels that are closest to the current pixel are either pixels A, B, C, D, I, J, K, L, and M included in a previously encoded area adjacent to the current block or previously predicted pixels included in the current block.

For example, a prediction value of a pixel a is determined based on at least one of the pixel values of the pixels A, M, and I. Also, a prediction value of a pixel b is determined based on at least one of the pixel values of the pixels A and B and the prediction value of the pixel a. A prediction value of the pixel f is determined based on at least one of the prediction values of the pixels a, b, and e. Prediction values of other pixels may be set along arrows.

A prediction value of a current pixel may be set based on pixel values or prediction values of pixels that are closest to the current pixel, or may be determined to be an average value of pixel values of pixels.

For example, the prediction value of the pixel a may be predicted based on an average value of the pixel values of the pixels A, M, and I, and the prediction value of the pixel b may be determined based on an average value of the pixel values of the pixels A and B and the prediction value of the pixel a. Also, the prediction value of the pixel f may be determined based on an average value of the prediction values of the pixels a, b, and e.

Figure 7B:
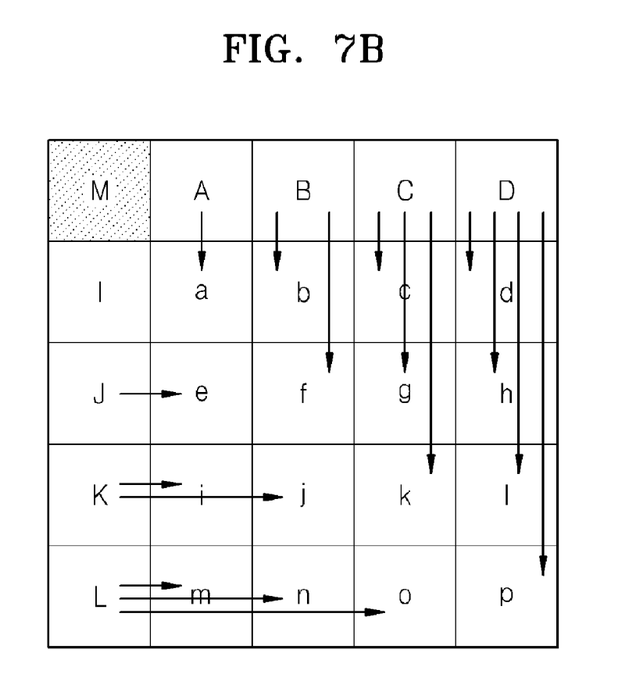

According to the intra prediction mode illustrated in FIG. 7B, a current pixel is determined based on a pixel value of a pixel that is nearer to the current pixel, from among a pixel the nearest horizontal distance from the current pixel and a pixel the nearest vertical distance from the current pixel, from among pixels included in a previously encoded area adjacent to a current block, while intra predicting the current block.

For example, a prediction value of a pixel b is predicted based on a pixel value of a pixel B, and a prediction value of a pixel g is determined based on a pixel value of a pixel C. Also, a prediction value of a pixel j is determined based on a pixel K.

Since horizontal distances and vertical distances of pixel values of pixels a, f, k, and p to pixels included in a previously encoded area are the same, prediction values of the pixels a, f, k, and p are determined based on either pixel values of pixels the nearest vertical and horizontal distances from the pixels a, f, k, and p. In FIG. 7B, the prediction values of the pixels a, f, k, and p are determined based on the pixel values of the pixels A, B, C, and D located in the top of the current bock, but the prediction values of the pixels a, f, k, and p may also be determined based on the pixel values of the pixels I, J, K, and L.

Figure 7C:
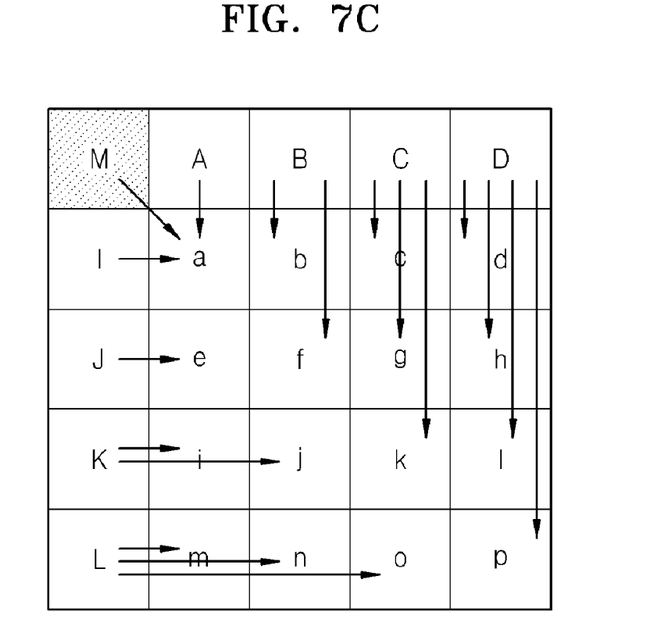

The intra prediction mode illustrated in FIG. 7C is identical to the intra prediction mode of FIG. 7B, except that a method of predicting a pixel a is different. The pixel a is adjacent to three pixels A, I, and M that are previously encoded. Accordingly, for more accurate prediction, an average value of the pixels A, I, and M may be used to determine the prediction value of the pixel a, instead of using only one of the pixel values of the pixels A, I, and X.

Figure 7D:
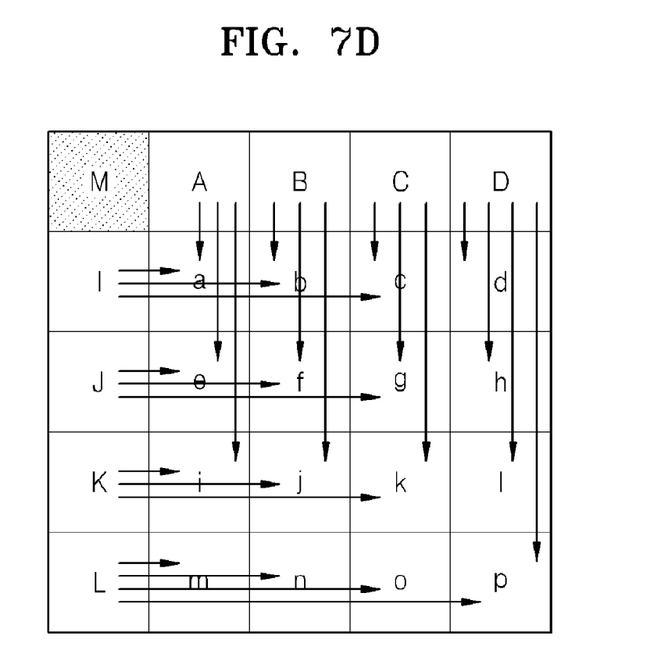

According to the intra prediction mode illustrated in FIG. 7D, a prediction value of a current pixel is determined based on an average value of a pixel value of a pixel the nearest horizontal distance from the current pixel and a pixel value of a pixel the nearest vertical distance from the current pixel, from among pixels included in a previously encoded area adjacent to a current block while intra predicting the current block.

For example, a prediction value of a pixel a is determined based on an average value of pixel values of pixels A and I, and a prediction value of a pixel g is determined based on an average value of pixel values of pixels C and J. Here, prediction values of pixels d, h, l, m, n, and o are predicted in a vertical or horizontal direction without using an average value of other pixels. In other words, the prediction values of the pixels m, n, and o are determined based on a pixel value of a pixel L, and the prediction values of the pixels d, h, and L are determined based on a pixel value of a pixel D. This is because the pixels d, h, and l do not need to refer to the pixel values of the pixels I, J, and K since horizontal distances are too big, and the pixels m, n, and o do not need to refer to the pixel values of the pixels A, B, and C since vertical distances are too big.

Figure 7E:
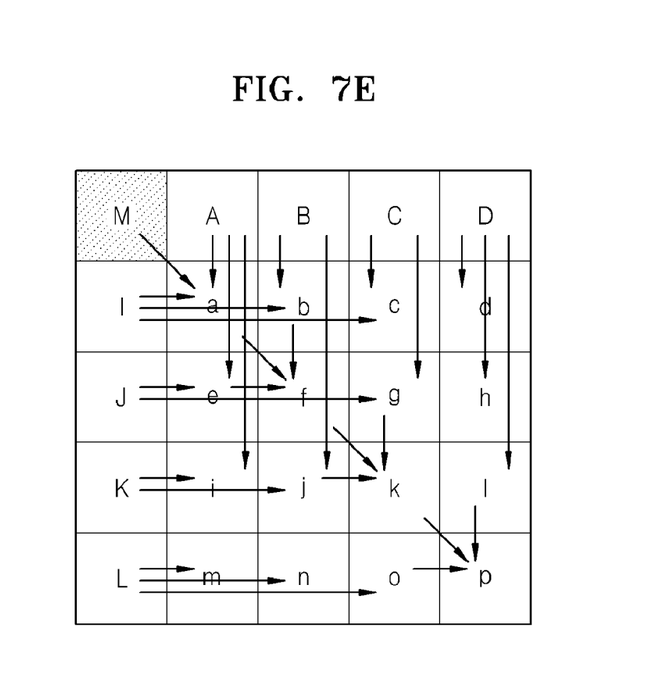

The intra prediction mode illustrated in FIG. 7E is identical to the intra prediction mode of FIG. 7D, except that a method of predicting diagonal pixels, i.e. pixels a, f, k, and p is different.

Prediction values of the diagonal pixels are determined based on an average value of pixel values or prediction values of pixels nearest to a corresponding pixel. A prediction value of the pixel a is determined based on an average value of pixel values of pixels A, M, and I, and a prediction value of the pixel f is determined based on an average value of prediction values of pixels a, b, and e.

Referring back to FIG. 5, when the predictor 510 generates a prediction block by predicting a current block via inter prediction or intra prediction, the entropy encoder 520 entropy encodes a residual block generated by subtracting the prediction block from an original block. A bitstream is generated by entropy encoding residual values included in the residual block via Context-Adaptive Binary Arithmetic Coding (CABAC) or Context-Adaptive Variable Length Coding (CAVLC). By repeating the above prediction and entropy encoding in a block unit, a bitstream for an image based on the 4 least significant bits of the image is generated.

Referring back to FIG. 1, when the second encoder 130 generates a bitstream for an image based on the 4 least significant bits of the image, the multiplexer 140 generates a bitstream for an input image by multiplexing a bitstream based on n-m bit planes generated in the first encoder 120 and a bitstream generated in the second encoder 130.

By encoding an input image using the apparatus 100 of FIG. 1, bit planes of most significant bits are efficiently encoded by using a conventional bit plane-based image encoding method, least significant bits having strong randomness are encoded by using a block-based image encoding method. Accordingly, effective lossless encoding is possible.

Figure 8:
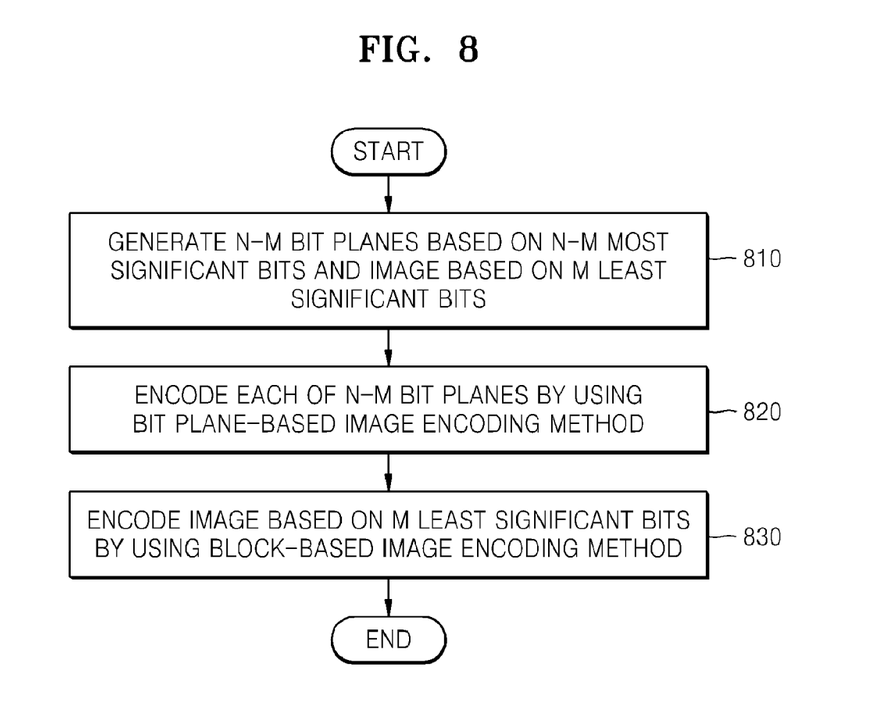
FIG. 8 is a flowchart illustrating a method of encoding an image, according to an embodiment of the present invention.

FIG. 8 is a flowchart illustrating a method of encoding an image, according to an embodiment of the present invention.

Referring to FIG. 8, the apparatus 100 of FIG. 1 generates n-m bit planes based on the n-m most significant bits, and an image based on the m least significant bits in operation 810. An input image including n-bit pixel values is divided into a plurality of bit planes and an image based on least significant bits, in order to encode the input image by using different encoding methods according to pixel locations. Here, as described above, the n-bit pixel values are converted to gray codes, and then the input image is divided from the gray codes.

In operation 820, the apparatus 100 encodes each of the n-m bit planes generated in operation 810 by using a bit plane-based image encoding method. Each of the bit planes is lossless compression encoded according to a JBIG standard.

In operation 830, the apparatus 100 encodes the image based on the m least significant bits generated in operation 810 by using a block-based image encoding method. Prediction encoding is performed by using a conventional block-based image encoding method, such as H.264. The image is predicted in block units via inter prediction or intra prediction, and residual blocks are entropy encoded. Here, as described above, intra prediction may be performed in block units based on one of the intra prediction methods illustrated in FIGS. 6 and 7A through 7E.

Figure 9:
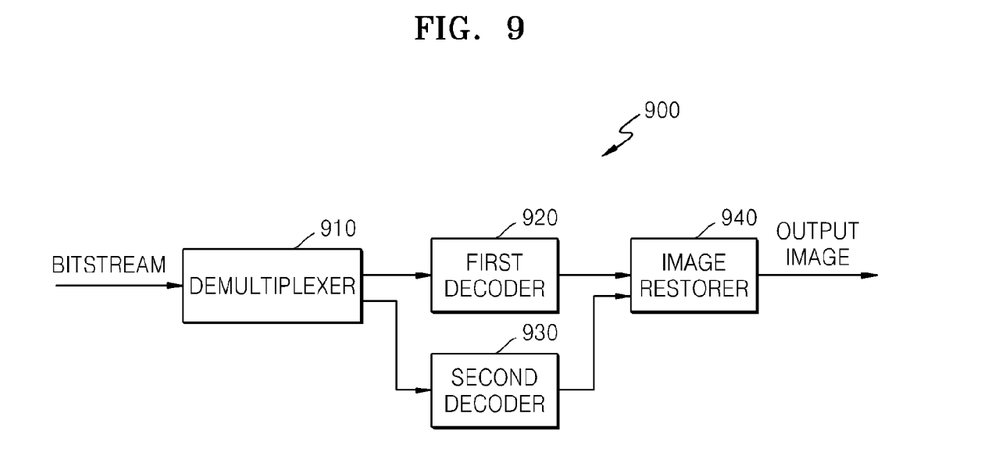
FIG. 9 is a diagram illustrating an apparatus for decoding an image, according to an embodiment of the present invention.

FIG. 9 is a block diagram of an apparatus 900 for decoding an image, according to an embodiment of the present invention.

Referring to FIG. 9, the apparatus 900 according to the present embodiment includes an demultiplexer 910, a first decoder 920, a second decoder 930, and an image restorer 940.

The demultiplexer 910 receives a bitstream for an output image including n-bit pixel values, and demultiplexes the received bitstream into a bitstream for n-m bit planes based on the n-m most significant bits, and a bitstream for an image based on the m least significant bits.

The first decoder 920 receives the bitstream for the n-m bit planes from the demultiplexer 910, and restores the n-m bit planes by decoding the received bitstream. The first decoder 920 corresponds to the first encoder 120 of FIG. 1, and decodes each bit plane according to a JBIG standard, like the first encoder 120.

The second decoder 930 receives the bitstream for the image based on the m least significant bits from the demultiplexer 910, and decodes the received bitstream by using a block-based image decoding method, such as H.264. As a result of decoding the received bitstream, residual values of the image based on the m least significant bits are restored. The second decoder 930 corresponds to the second encoder 130 of FIG. 1, and will be described in detail with reference to FIG. 10.

Figure 10:
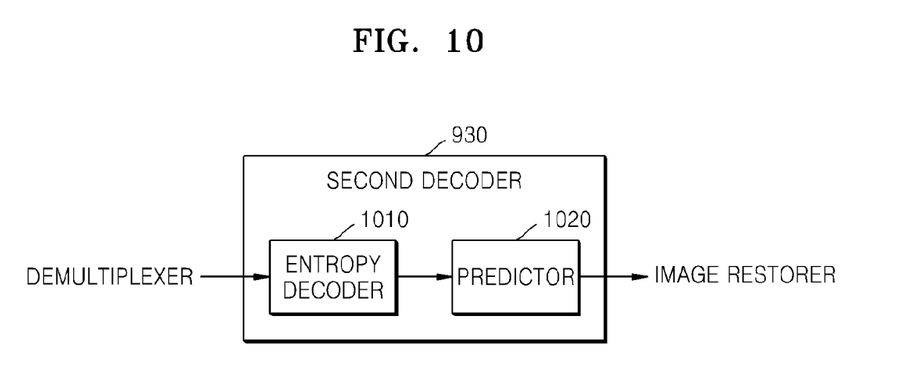
FIG. 10 is a block diagram of a decoder for performing a block-based image decoding process, according to an embodiment of the present invention.

FIG. 10 is a block diagram of the second decoder 930 according to an embodiment of the present invention.

Referring to FIG. 10, the second decoder 930 according to the current embodiment includes an entropy decoder 1010 and a predictor 1020.

The entropy decoder 1010 receives the bitstream for the image based on the m least significant bits, and entropy decodes the received bitstream. Entropy decoding is performed via CABAC or CAVLC and thus a residual block included in the image is restored.

The predictor 1020 generates a prediction block by predicting a current block via inter prediction or intra prediction. The prediction block of the current block is generated by using any one of the intra prediction modes illustrated in FIGS. 6 and 7A through 7E. The prediction block is added to the residual block generated in the entropy decoder 1010. The image based on the m least significant bits is restored by repeating the entropy decoding and prediction in a block unit.

Referring back to FIG. 9, the image restorer 940 restores the output image including the n-bit pixel values, based on the n-m bit planes restored in the first decoder 920 and the image based on the m least significant bits restored in the second decoder 930. The image restorer 940 performs processes that are the opposite of dividing an image described with reference to the image divider 110 of FIG. 1 and FIGS. 2 through 4.

Figure 11:
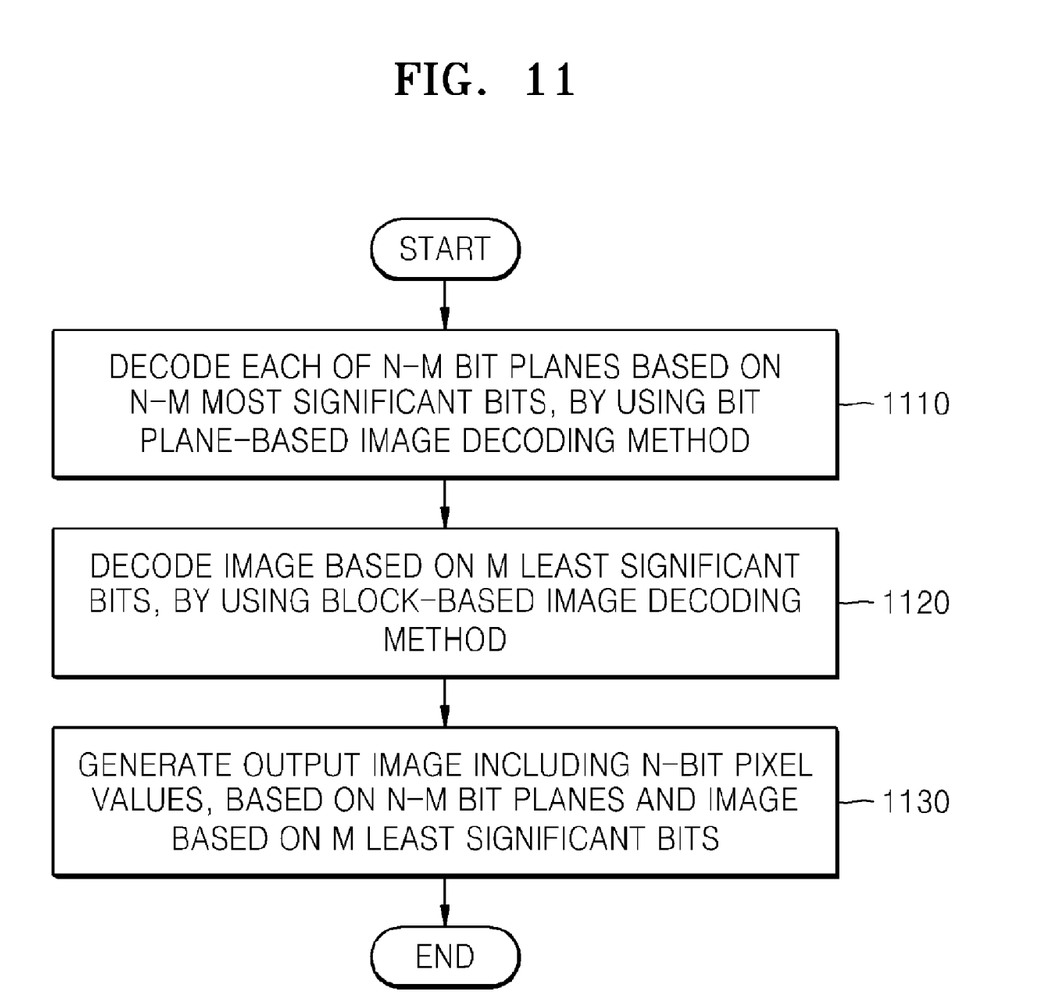
FIG. 11 is a flowchart illustrating a method of decoding an image, according to an embodiment of the present invention.

FIG. 11 is a flowchart illustrating a method of decoding an image, according to an embodiment of the present invention.

Referring to FIG. 11, the apparatus 900 decodes each of n-m bit planes based on the n-m most significant bits by using a bit plane-based image decoding method in operation 1110. The bit-planes are decoded according to a JBIG standard.

The apparatus 900 decodes an image based on the m least significant bits by using a block-based image decoding method such as H.264 in operation 1120. The image is restored by prediction decoding a received bitstream by using the block-based image decoding method. Residual blocks are restored by entropy decoding a bitstream for the image. Then, prediction blocks of blocks included in the image are generated by using any one of the intra prediction modes illustrated in FIGS. 6 and 7A through 7E, and then the image is restored by adding the prediction blocks and the residual blocks.

In operation 1130, the apparatus 900 generates an output image including n-bit pixel values, based on the n-m bit planes generated in operation 1110 and the image generated in operation 1120. In operation 1130, processes of dividing an image described with reference to FIGS. 2 through 4 are performed in an opposite direction.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. In other exemplary embodiments, the computer readable recording medium may include carrier waves (such as data transmission through the Internet). The computer readable recording medium can also be distributed over network coupled computer systems so that the computer readable code is stored and executed in a distributed fashion, in yet other exemplary embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image, the method comprising:
generating from an input image comprising n-bit pixel values, n-m bit planes based on n-m most significant bits of the n-bit pixel values and an image based on m least significant bits of the n-bit pixel values;
encoding each of the n-m bit planes by using bit plane-based image encoding; and
encoding, by using an apparatus, the image based on the m least significant bits of the n-bit pixel values by using block-based image encoding,
wherein n and m are positive integers satisfying 0<m<n.

2. The method of claim 1, wherein the bit plane-based image encoding comprises performing lossless compression encoding on the n-m bit planes according to a Joint Bi-level Image Experts Group (JBIG) standard.

3. The method of claim 1, wherein the encoding of the image based on the m least significant bits of the n-bit pixel values comprises performing prediction encoding on blocks included in the image based on the m least significant bits, based on an intra prediction mode selected from a plurality of intra prediction modes.

4. The method of claim 3, wherein the plurality of intra prediction modes comprises a horizontal mode, a vertical mode, and a direct current mode.

5. The method of claim 3, wherein the plurality of intra prediction modes comprises a prediction mode of predicting a predetermined pixel of a current block, based on pixel values of pixels adjacent to the predetermined pixel,
wherein the pixel values of the pixels adjacent to the predetermined pixel comprise at least one of a pixel value of a pixel included in a previously encoded area adjacent to the current block and a prediction value of a previously predicted pixel adjacent to the predetermined pixel.

6. The method of claim 3, wherein the plurality of intra prediction modes comprises a prediction mode of predicting a predetermined pixel of a current block, based on an average value of pixel values of pixels adjacent to the predetermined pixel,
wherein the pixel values of the pixels adjacent to the predetermined pixel comprise at least one of a plurality of pixel values of pixels included in a previously encoded area adjacent to the current block and prediction values of previously predicted pixels adjacent to the predetermined pixel.

7. The method of claim 3, wherein the plurality of intra prediction modes comprise a prediction mode of predicting a predetermined pixel of a current block, based on an average value of a pixel value of a pixel at a nearest horizontal distance from a pixel included in a previously encoded area adjacent to the current block and a pixel value of a pixel at a nearest vertical distance from the pixel included in the previously encoded area adjacent to the current block.

8. The method of claim 3, wherein the plurality of intra prediction modes comprise a prediction mode of predicting a predetermined pixel of a current block, based on a pixel value of a pixel that is nearer to a pixel included in a previously encoded area adjacent to the current block, from among pixels at a nearest horizontal distance and at a nearest vertical distance from the pixel included in the previously encoded area adjacent to the current block.

9. The method of claim 1, wherein the n-m bit planes based on the n-m most significant bits and the image based on the m least significant bits are respectively bit planes based on n-m most significant bits of gray codes of bit strings of pixel values of the input image and an image based on m least significant bits of the gray codes.

10. A method of decoding an image, the method comprising:
decoding a bitstream of n-m bit planes based on n-m most significant bits of n-bit pixel values, by using bit plane-based image decoding, to generate the n-m bit planes;
decoding, by using an apparatus, a bitstream of an image based on m least significant bits of the n-bit pixel values, by using block-based image decoding to generate the image based on m least significant bits; and
generating an output image comprising the n-bit pixel values, from the n-m bit planes and the image based on the m least significant bits,
wherein n and m are positive integers satisfying 0<m<n.

11. The method of claim 10, wherein the bit plane-based image decoding comprises decoding the bitstream of the n-m bit planes that are lossless compressed according to a Joint Bi-level Image Experts Group (JBIG) standard.

12. The method of claim 10, wherein the decoding the bitstream of the image based on the m least significant bits of the n-bit pixel values comprises prediction decoding blocks included in the image based on the m least significant bits of the n-bit pixel values, based on one of a plurality of intra prediction modes.

13. The method of claim 12, wherein the plurality of intra prediction modes comprises a horizontal mode, a vertical mode, and a direct current (DC) mode.

14. The method of claim 12, wherein the plurality of intra prediction modes comprises a prediction mode of predicting a predetermined pixel of a current block, based on pixel values of pixels adjacent to the predetermined pixel,
wherein the pixel values of the pixels adjacent to the predetermined pixel comprise at least one of a pixel value of a pixel included in a previously decoded area adjacent to the current block, and a pixel value of a previously predicted pixel adjacent to the predetermined pixel.

15. The method of claim 12, wherein the plurality of intra prediction modes comprises a prediction mode of predicting a predetermined pixel of a current block, based on an average value of pixel values of pixels adjacent to the predetermined pixel,
wherein the pixel values of the pixels adjacent to the predetermined pixel comprise at least one of a plurality of pixel values of pixels included in a previously decoded area adjacent to the current block, and prediction values of previously predicted pixels adjacent to the predetermined pixel.

16. The method of claim 12, wherein the plurality of intra prediction modes comprises a prediction mode of predicting a predetermined pixel of a current block, based on an average of a pixel value of a pixel at a nearest horizontal distance from a pixel included in a previously decoded area adjacent to the current block, and a pixel value of a pixel at a nearest vertical distance from the pixel included in the previously decoded area adjacent to the current block.

17. The method of claim 12, wherein the plurality of intra prediction modes comprises a prediction mode of predicting a predetermined pixel in a current block, based on a pixel value of a pixel that is nearer to a pixel included in a previously decoded area adjacent to the current block, from among a pixel at a nearest vertical distance from the pixel included in the previously decoded area adjacent to the current block and a pixel at a nearest horizontal distance from the pixel included in the previously decoded area adjacent to the current block.

18. The method of claim 10, wherein the n-m bit planes based on the n-m most significant bits and the image based on the m least significant bits respectively are bit planes based on n-m most significant bits of gray codes of bit strings of pixel values of an input image and an image based on m least significant bits of the gray codes.

19. An apparatus for encoding an image, the apparatus comprising:
- an image divider which generates from an input image comprising n-bit pixel values, n-m bit planes based on n-m most significant bits of the n-bit pixel values and an image based on m least significant bits of the n-bit pixel values;
- a first encoder which encodes each of the n-m bit planes by using bit plane-based image encoding;
- a second encoder which encodes the image based on the m least significant bits of the n-bit pixel values by using block-based image encoding; and
- a multiplexer which multiplexes the encoded n-m bit planes and the encoded image based on the m least significant bits generated by the first and second encoders, wherein n and m are positive integers satisfying 0<m<n.

20. An apparatus for decoding an image, the apparatus comprising:
- an demultiplexer which demultiplexes data of an output image comprising n-bit pixel values into data of n-m bit planes based on n-m most significant bits of the n-bit pixel values and data of an image based on m least significant bits of the n-bit pixel values;
- a first decoder which decodes the data of the n-m bit planes based on the n-m most significant bits of the n-bit pixel values, by using bit plane-based image decoding;
- a second decoder which decodes the image based on the m least significant bits of the n-bit pixel values, by using block-based image decoding; and
- an image restorer which generates the output image comprising the n-bit pixel values, from the n-m bit planes and the image based on the m least significant bits, wherein n and m are positive integers satisfying 0<m<n.

21. A non-transitory computer readable recording medium having recorded thereon a program for executing a method for encoding an image, the method comprising:
- generating, from an input image comprising n-bit pixel values, n-m bit planes based on n-m most significant bits of the n-bit pixel values and an image based on m least significant bits of the n-bit pixel values;
- encoding each of the n-m bit planes by using bit plane-based image encoding; and
- encoding the image based on the m least significant bits of the n-bit pixel values by using block-based image encoding, wherein n and m are positive integers satisfying 0<m<n.

22. A non-transitory computer readable recording medium having recorded thereon a program for executing a method of decoding an image, the method comprising:
- decoding a bitstream of n-m bit planes based on n-m most significant bits of n-bit pixel values, by using bit plane-based image decoding, to generate the n-m bit planes;
- decoding a bitstream of an image based on m least significant bits of the n-bit pixel values, by using block-based image decoding to generate the image based on m least significant bits; and
- generating an output image comprising the n-bit pixel values, from the n-m bit planes and the image based on the m least significant bits, wherein n and m are positive integers satisfying 0<m<n.

* * * * *